No. 631,473. Patented Aug. 22, 1899.
T. A. PEDEN.
CULTIVATOR TOOTH.
(Application filed Apr. 5, 1899.)
(No Model.)
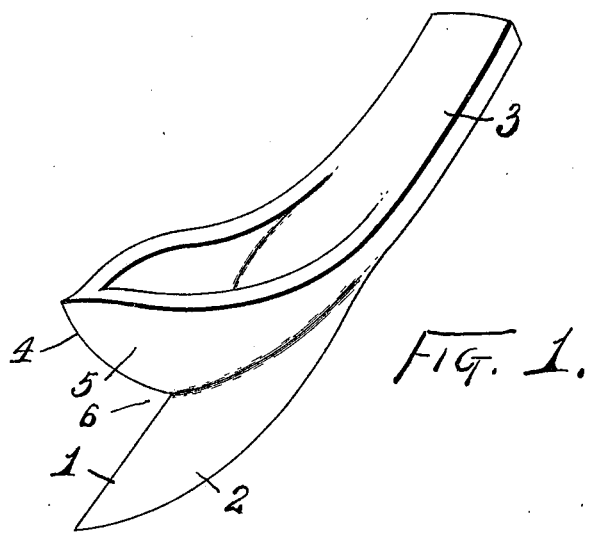
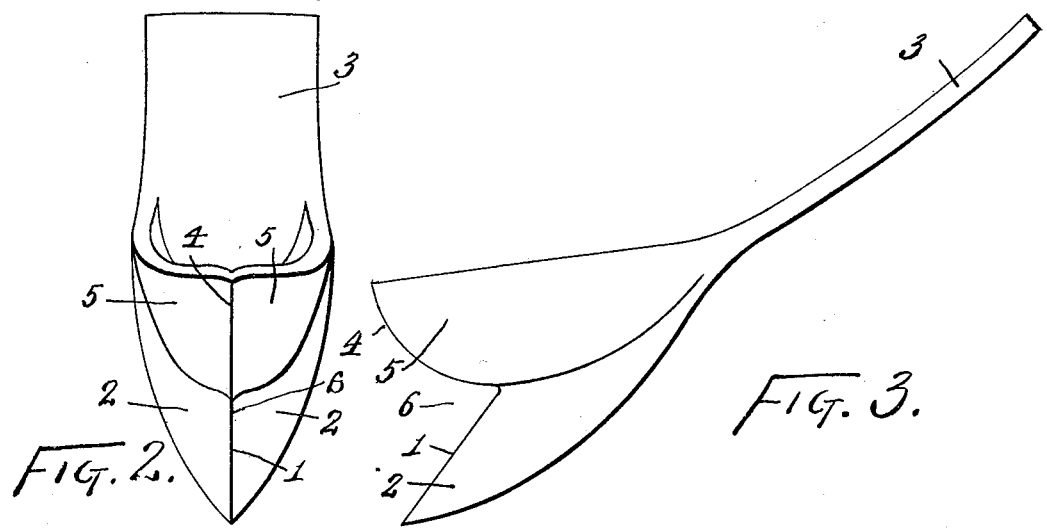
Witnesses:
E. R. Shipley.
M. S. Belden.
Thomas A. Peden
Inventor
by James W. See
Attorney
THE NORRIS PETERS CO., PHOTO-LITHO., WASHINGTON, D. C.

UNITED STATES PATENT OFFICE.

THOMAS A. PEDEN, OF LOGANSPORT, INDIANA.

CULTIVATOR-TOOTH.

SPECIFICATION forming part of Letters Patent No. 631,473, dated August 22, 1899.

Application filed April 5, 1899. Serial No. 711,848. (No model.)

*To all whom it may concern:*

Be it known that I, THOMAS A. PEDEN, of Logansport, Cass county, Indiana, have invented certain new and useful Improvements in Cultivator-Teeth, of which the following is a specification.

This invention, pertaining to improvements in cultivator-teeth or plow-points, will be readily understood from the following description, taken in connection with the accompanying drawings, in which—

Figure 1 is a perspective view, Fig. 2 a front elevation, and Fig. 3 a side elevation, of my improved cultivator-teeth.

In the drawings, 1 indicates the subtooth, the same consisting of a broad cutter having a thin cutting edge, with its lower extremity or point in angular advance of its upper portion, the rear portion of the tooth curving rearwardly and upwardly; 2, the angular side faces of the subtooth, which faces may be either flat or somewhat concave or convex; 3, the shank of the tooth, adapted to be clamped or clevised to any of the usual standards of plows or cultivators; 4, the supertooth, the same consisting of a broad cutter having its cutting edge in the vertical plane of the cutting edge of the subtooth, the cutting edge of the supertooth having preferably a convex curvature; 5, the side faces of the supertooth, the same being preferably formed with convexities blending forwardly into concave sides at the cutting edge of the supertooth, and 6 the frontal notch comprised between the cutting edges of the subtooth and supertooth.

For the sake of lightness the backs of the subteeth and the superteeth may be hollowed out. Viewing the subtooth 1 independent of the supertooth it presents the aspect of a thick colter with an advanced point. Viewing the supertooth 4 independent of the subtooth it presents the aspect of the bow of a boat with a curved cut-water. Viewing the supertooth and subtooth together they present the aspect of a curved boat-prow armed with a colter having an advanced point, the rear portion of its edge meeting the receded portion of the prow, a notch being formed in the common cutting edge formed by the two teeth. The subtooth opens the soil and throws the dirt upwardly and the supertooth spreads the upthrown soil, ridging it at each side of the furrow. The improved teeth can be used singly in an implement or they may be employed in gangs, according to the kind of implement to which they are applied.

I claim as my invention—

1. The improved cultivator-tooth having a forwardly-presenting cutting edge provided with a notch and forming a subtooth and supertooth, substantially as set forth.

2. The improved cultivator-tooth having a forwardly-presenting cutting edge provided with a notch and forming a subtooth and supertooth, the cutting edge of the subtooth being straight, and the cutting edge of the supertooth being curved, substantially as set forth.

3. The improved cultivator-tooth having a forwardly-presenting cutting edge provided with a notch and forming a subtooth and supertooth, the side faces of the supertooth being generally convex, substantially as set forth.

4. The improved cultivator-tooth comprising a broad body having its sides converging forwardly to a cutting edge, said cutting edge having a forwardly-presenting notch producing the cutting edges of a subtooth and a supertooth, substantially as set forth.

THOMAS A. PEDEN.

Witnesses:
MAY MCCONNELL,
E. B. MCCONNELL.